(12) United States Patent
Li

(10) Patent No.: US 11,381,479 B2
(45) Date of Patent: Jul. 5, 2022

(54) SERVICE DEPLOYMENT METHOD AND APPARATUS, AND NETWORK ELEMENT

(71) Applicant: HUAWEI TECHNOLOGIES CO., LTD., Guangdong (CN)

(72) Inventor: Shitao Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 16/173,092

(22) Filed: Oct. 29, 2018

(65) Prior Publication Data

US 2019/0068463 A1 Feb. 28, 2019

Related U.S. Application Data

(63) Continuation of application No. PCT/CN2017/077733, filed on Mar. 22, 2017.

(30) Foreign Application Priority Data

Apr. 29, 2016 (CN) .......................... 201610284101.5

(51) Int. Cl.
*H04L 41/5054* (2022.01)
*H04L 41/0806* (2022.01)
(Continued)

(52) U.S. Cl.
CPC ...... *H04L 41/5054* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 10,545,779 B2 * 1/2020 Gokurakuji ............... G06F 9/46
2016/0057102 A1 2/2016 Wei et al.
(Continued)

FOREIGN PATENT DOCUMENTS

CN 104219127 A 12/2014
CN 104734931 A 6/2015
(Continued)

OTHER PUBLICATIONS

"TOSCA Simple Profile for Network Functions Virtualization (NFV) Version 1.0", OASIS Open, Mar. 17, 2016 [retrieved on Mar. 2, 2022]. Retrieved from the Internet: <URL: http://docs.oasis-open.org/tosca/tosca-nfv/v1.0/csd03/tosca-nfv-v1.0-csd03.pdf>. (Year: 2016).*

(Continued)

*Primary Examiner* — Kevin T Bates
*Assistant Examiner* — Dae Kim
(74) *Attorney, Agent, or Firm* — Fish & Richardson P.C.

(57) ABSTRACT

A service deployment method and apparatus, and a network element are provided. The method includes: receiving, by an NFVO, an instantiation request for instantiating a network service NS, obtaining the NSD according to the identifier of the NSD, sending the node information of the VNF to a VNFM; sending the node information of the VL to a VIM; separately receiving an instantiation success response message returned by the VNFM and the VIM separately; and sending the connection requirement information to the VIM.

11 Claims, 7 Drawing Sheets

(51) Int. Cl.
    *G06F 9/455*     (2018.01)
    *H04L 12/46*     (2006.01)
    *H04L 41/5051*   (2022.01)
    *G06F 9/50*      (2006.01)
    *H04L 41/12*     (2022.01)
    *H04L 45/586*    (2022.01)

(52) U.S. Cl.
    CPC .......... *H04L 12/46* (2013.01); *H04L 41/0806* (2013.01); *H04L 41/5051* (2013.01); *G06F 2009/45595* (2013.01); *H04L 41/12* (2013.01); *H04L 45/586* (2013.01)

(56) References Cited

U.S. PATENT DOCUMENTS

| | | | | |
|---|---|---|---|---|
| 2017/0126792 | A1* | 5/2017 | Halpern | ................ G06F 9/5061 |
| 2018/0013586 | A1 | 1/2018 | Wang | |
| 2018/0316730 | A1* | 11/2018 | Schaefer | ............. H04L 41/0883 |

FOREIGN PATENT DOCUMENTS

| | | | |
|---|---|---|---|
| CN | 104954220 | A | 9/2015 |
| EP | 2955940 | A1 | 12/2015 |
| WO | 2016045082 | A1 | 3/2016 |
| WO | 2017137881 | A1 | 8/2017 |

OTHER PUBLICATIONS

ETSI GS NFV-MAN 001 V1.1.1 (Dec. 2014), "Network Functions Virtualisation (NFV); Management and Orchestration," Group Specification, European Telecommunications Standards Institute (ETSI), Dec. 2014, 184 pages.
Extended European Search Report issued in European Application No. 17788575.3 dated Jan. 22, 2019, 8 pages.
Huawei Technologies Ltd,"VNF FG, NCT and SG Design Elements," NFVSWA(13)000059r3, Jan. 29, 2014, 3 pages.
ETSI GS NFV-IFA 014 V0.8.0 (Mar. 2016), "Network Functions Virtualisation (NFV); Management and Orchestration; Network Service Templates Specification," Mar. 2016, XP014271502, 26 pages.
Huawei Tech. (UK) Co., Ltd, "IFA014 5.5 6.2.3 6.3.3 6.5.2 6.6.2 delete CP in NS virtual link," input for NFV IFA, NFVIFA(16)000644r3; XP014271681, Apr. 1, 2016, 6 pages.
EPO Communication pursuant to 94(3) issued in European Application No. 17788575.3 dated Jan. 2, 2020, 7 pages.
International Search Report and Written Opinion issued in International Application No. PCT/CN2017/077733 dated May 31, 2017, 17 pages.
Office Action issued in Chinese Application No. 201610284101.5 dated Dec. 27, 2019, 10 pages.
Morera et al., "ETSI NFV IFA WG—Architecture and Interfaces," ETSI, 2015, 22 pages.
Office Action issued in Chinese Application No. 202011049206.5 dated Apr. 21, 2021, 6 pages (with English translation).

* cited by examiner

SERVICE DEPLOYMENT METHOD AND APPARATUS, AND NETWORK ELEMENT

CROSS-REFERENCE TO RELATED APPLICATIONS

This application is a continuation of International Application No. PCT/CN2017/077733, filed on Mar. 22, 2017, which claims priority to Chinese Patent Application No. 201610284101.5, filed on Apr. 29, 2016, The disclosures of the aforementioned applications are hereby incorporated by reference in their entireties.

TECHNICAL FIELD

The present invention relates to the field of cloud computer technologies, and in particular, to a service deployment method and apparatus, and a network element.

BACKGROUND

Network function virtualization (NFV) means that a function of a dedicated device in a conventional network is carried by using a general-purpose hardware device and a virtualization technology, so as to reduce high costs brought by deployment of the dedicated device. Software is not bound to dedicated hardware, so that a function of a network device is no longer dependent on the dedicated hardware. In addition, by using a feature of cloud computing, resources can be fully and flexibly shared, a new service is rapidly developed and deployed, and automatic deployment, scaling, fault isolation, self-healing, and the like are performed based on an actual service requirement. In an NFV architecture, a device that receives an instantiation request and performs instantiation processing on a corresponding service (deploys a service) according to the request is referred to as a virtualized service provision device, and a device that initiates the instantiation request is referred to as a service request device.

A virtualized Network Service (NS) in the NFV may be, for example, an IP Multimedia Subsystem (IMS) network service or an Evolved Packet Core (EPC) network service. An NS may include several Virtualized Network Function (VNF) modules that are also referred to as virtualized network elements. The VNF is software implementation of a network function that can be deployed on an NFV infrastructure. When virtualization deployment is performed on an NS, the service request device first needs to submit, to the service provision device, a Network Service Descriptor (NSD). The NSD mainly describes a topology structure of the network service and VNF descriptors (VNFD). A connection between the VNFs is described by using virtual link (VL) information in the topology structure. The VNFD describes a topology structure and a deployment requirement of a VNF, and includes a Virtualization Deployment Unit (VDU) included in the VNF, a Connection Point (CP), a VDU connected to a CP, and a VL to which the VNF needs to be connected. Services processed by VDUs in a same VNF are different from each other. Each VDU in the VNF is connected to a CP by using a VL, and each CP is connected to a VL, so that the VNF is connected to another VNF.

However, in the prior art, although an NSD includes specific VLs to which each VNF needs to establish a connection, because one VNF may have multiple CPs, a CP may be incorrectly connected to a VL, and consequently, a service is incorrectly executed.

SUMMARY

The present invention provides a service deployment method and apparatus, and a network element, so as to resolve a prior-art technical problem that because there may be multiple connection points on a same virtualized network function, a service may be incorrectly executed when different connection points are connected to a same virtual link.

According to a first aspect, an embodiment of the present invention provides a service deployment method. The method is described from a perspective of a network functions virtualization orchestrator NFVO. In the method, the NFVO receives an instantiation request for instantiating a network service NS, where the instantiation request includes an identifier of NS descriptor, NSD. After receiving the instantiation request, the NFVO obtains the NSD according to the identifier of the NSD, where the NSD includes node information of at least two virtualized network functions VNFs and node information of at least two virtual links VLs, a quantity of connection points CPs on the VNF is greater than or equal to 2, and the node information of the VNF includes an identifier of the VNF and connection requirement information used to represent a VL to which each CP on the VNF needs to be connected. Then, the NFVO sends the node information of the VNF to a virtualized network function manager VNFM, and sends the node information of the VL to a virtualized infrastructure manager VIM. Afterward, the NFVO separately receives an instantiation success response message returned by the VNFM and that returned by the VIM. The NFVO sends the connection requirement information to the VIM based on the instantiation success response messages received by the NFVO. Because the connection requirement information of the VL to which each CP on each VNF needs to be connected is clearly described in the node information of the VNF in the NSD, when there are at least two VLs, different CPs on the VNF can be prevented from being connected to an incorrect VL, so as to avoid a service execution error caused by an incorrect connection.

In a possible design, node information of at least one VL in the at least two VLs includes a type of a port on the at least one VL, and the connection requirement information further includes a type of a port on the VL to which each CP needs to be connected. Therefore, by using a precise description of the NSD, not only each CP is connected to a correct VL, but also when ports on the VL are of different types, it is further ensured that each CP is connected to a port that is on the VL and whose type is the same as the type of the connected port, so that it can be further ensured that the service can be correctly executed.

In a possible design, the connection requirement information is a correspondence between an identifier of each CP and the VL to which the CP needs to be connected. A description of the CP can be simplified by using the correspondence between the identifier of the CP and the VL.

According to a second aspect, an embodiment of the present invention provides a service deployment method. The method is described from a perspective of a virtualized infrastructure manager VIM. In the method, the VIM receives connection requirement information that is of connection points CPs on a virtualized network function VNF and the at least two VLs and that is sent by a network functions virtualization orchestrator NFVO, where the connection requirement information includes a VL to which each CP needs to be connected. After receiving the connection requirement information, the VIM connects, according to the connection requirement information, each CP to the VL to which the CP needs to be connected. The VIM connects, according to the connection requirement information, each CP to the VL to which the CP needs to be connected, so that when there are at least two VLs, different CPs on the VNF can be prevented from being connected to an incorrect VL, so as to avoid a service execution error caused by an incorrect connection.

In a possible design, the connection requirement information further includes a type of a port on the VL to which each CP needs to be connected.

Correspondingly, when receiving the connection requirement information that further includes the type of the port on the VL to which each CP needs to be connected, the VIM connects, according to the connection requirement information, each CP to a port that is on the VL to which the CP needs to be connected and whose type is the same as the type.

In a possible design, before the VIM receives the connection requirement information, the VIM further receives an instantiation request sent by the NFVO for instantiating the VL. The instantiation request includes node information of the VL, the node information of the VL includes a type of the VL and a type of each port on the VL, and port types of at least two ports on the VL are different. After receiving the node information, the VIM instantiates the VL according to the node information of the VL, and configures the port on the VL according to the type of each port on the VL when instantiating the VL. The VIM sends an instantiation success response message to the NFVO. In this way, the VIM configures each port on the VL according to the type of the port on the VL, so as to ensure that the VIM subsequently connects the CP according to the type of the port on the VL.

According to a third aspect, an embodiment of the present invention provides a service deployment method. The method is described from a perspective of a service request device, such as an Operations Support System and Business Support System (OSS/BSS). In the method, the service request device sends, to a service provision device such as an NFVO, a registration request for registering network service descriptor, NSD, where the NSD includes node information of at least two virtualized network functions VNFs and node information of at least two virtual links VLs. A quantity of connection points CPs on the VNF is greater than or equal to 2, the node information of the VNF includes connection requirement information used to represent a VL to which each CP on the VNF needs to be connected, and the connection requirement information is used to determine, in a process of instantiating the NS, the VL to which each CP on the VNF is to be connected. The service provision device registers and stores the NSD, and then returns a registration success response message to the service request device. Because the service request device adds, to the NSD, the connection requirement information that describes the VL to which each CP on the VNF needs to be connected, and registers the connection requirement information with the NFVO, subsequently, the VIM can connect the CP to a correct VL according to the connection requirement information, so that when there are at least two VLs, different CPs on the VNF are prevented from being connected to an incorrect VL, so as to avoid a service execution error caused by an incorrect connection.

In a possible design, node information of at least one VL in the at least two VLs includes a type of a port on the at least one VL; the connection requirement information further includes a type of a port on the VL to which each CP needs to be connected; and the type of the port is used to determine, in the process of instantiating the NS, the type of the port on the VL to which each CP on each VNF is to be connected.

According to a fourth aspect, an embodiment of the present invention provides a service deployment apparatus. Specifically, the apparatus may be a network functions virtualization orchestrator NFVO. The apparatus has functions for implementing the NFVO in the method design. The functions may be implemented by using hardware or may be implemented by executing corresponding software by hardware. The hardware or software includes one or more units corresponding to the foregoing functions.

In a possible design, a specific structure of the service deployment apparatus used as the NFVO may include a receiving unit, a processing unit, and a sending unit. The receiving unit, the processing unit, and the sending unit may execute the corresponding functions in the method.

According to a fifth aspect, an embodiment of the present invention provides a service deployment apparatus. Specifically, the apparatus may be a virtualized infrastructure manager VIM. The apparatus has functions for implementing the VIM in the method design. The functions may be implemented by using hardware or may be implemented by executing corresponding software by hardware. The hardware or software includes one or more units corresponding to the foregoing functions.

In a possible design, a specific structure of the service deployment apparatus used as the VIM may include a receiving unit, a processing unit, and a sending unit. The receiving unit, the processing unit, and the sending unit may execute the corresponding functions in the method.

According to a sixth aspect, an embodiment of the present invention provides a service deployment apparatus. Specifically, the apparatus may be a service request device. The apparatus has functions for implementing the service request device in the method design. The functions may be implemented by using hardware or may be implemented by executing corresponding software by hardware. The hardware or software includes one or more units corresponding to the foregoing functions.

In a possible design, a specific structure of the service deployment apparatus used as the service request device may include a receiving unit and a sending unit. The receiving unit and the sending unit may execute the corresponding functions in the method.

According to a seventh aspect, an embodiment of the present invention provides a network element. The network element may be a network functions virtualization orchestrator NFVO. The network element includes: a memory, configured to store computer executable program code; a transceiver; and a processor, coupled to the memory and the transceiver. The program code includes an instruction, and when the processor executes the instruction, the instruction enables the network element to execute the method executed by the NFVO.

According to an eighth aspect, an embodiment of the present invention provides a network element. The network element may be a virtualized infrastructure manager VIM. The network element includes: a memory, configured to store computer executable program code; a transceiver; and a processor, coupled to the memory and the transceiver. The program code includes an instruction, and when the processor executes the instruction, the instruction enables the network element to execute the method executed by the VIM.

According to a ninth aspect, an embodiment of the present invention provides a network element. The network element may be a service request device, and include: a memory, configured to store computer executable program code; a transceiver; and a processor, coupled to the memory and the transceiver. The program code includes an instruction, and when the processor executes the instruction, the instruction enables the network element to execute the method executed by the service request device.

In a possible design, the service request device is an operations support system and business support system OSS/BSS.

According to a tenth aspect, an embodiment of the present invention provides a computer storage medium that is used to store a computer software instruction used by the service deployment apparatus described according to the fourth aspect or the network element described according to the seventh aspect, and that includes the designed program used to execute the foregoing aspects.

According to an eleventh aspect, an embodiment of the present invention provides a computer storage medium that is used to store a computer software instruction used by the service deployment apparatus described according to the fifth aspect or the network element described according to the eighth aspect, and that includes the designed program used to execute the foregoing aspects.

According to a twelfth aspect, an embodiment of the present invention provides a computer storage medium that is used to store a computer software instruction used by the service deployment apparatus described according to the sixth aspect or the network element described according to the ninth aspect, and that includes the designed program used to execute the foregoing aspects.

According to a thirteenth aspect, an embodiment of the present invention provides a service deployment method. The method is described from a perspective of a virtualized network function manager VNFM. In the method, the VNFM receives an instantiation request sent by a network functions virtualization orchestrator NFVO for instantiating a virtualized network function VNF, where the instantiation request includes an identifier of the VNF. After receiving the instantiation request, the VNFM obtains a VNF descriptor, VNFD according to the identifier of the VNF, where the VNFD includes an identifier of each connection point CP on the VNF and deployment information of the VNF. Then, the VNFM instantiates the VNF according to the deployment information, and after successfully instantiating the VNF, the VNFM configures each CP by using the identifier of each CP.

With reference to any possible design, the node information of the VL further includes a bandwidth or a quantity of a port of each type.

According to the technical solutions provided in the embodiments of the present invention, because the connection requirement information of the VL to which each CP on each VNF needs to be connected is clearly described in the node information of the VNF in the NSD, in the subsequent process of instantiating the NS, each CP may be connected, according to the connection requirement information, to the VL to which each CP needs to be connected, so that it is ensured that the service can be correctly executed.

DESCRIPTION OF EMBODIMENTS

The present invention provides a service deployment method and apparatus, and a network element, so as to resolve a prior-art technical problem that because there may be multiple connection points on a same virtualized network function, a service may be incorrectly executed when different connection points are connected to a same virtual link.

The following describes the technical solutions in the embodiments of the present invention with reference to the accompanying drawings in the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
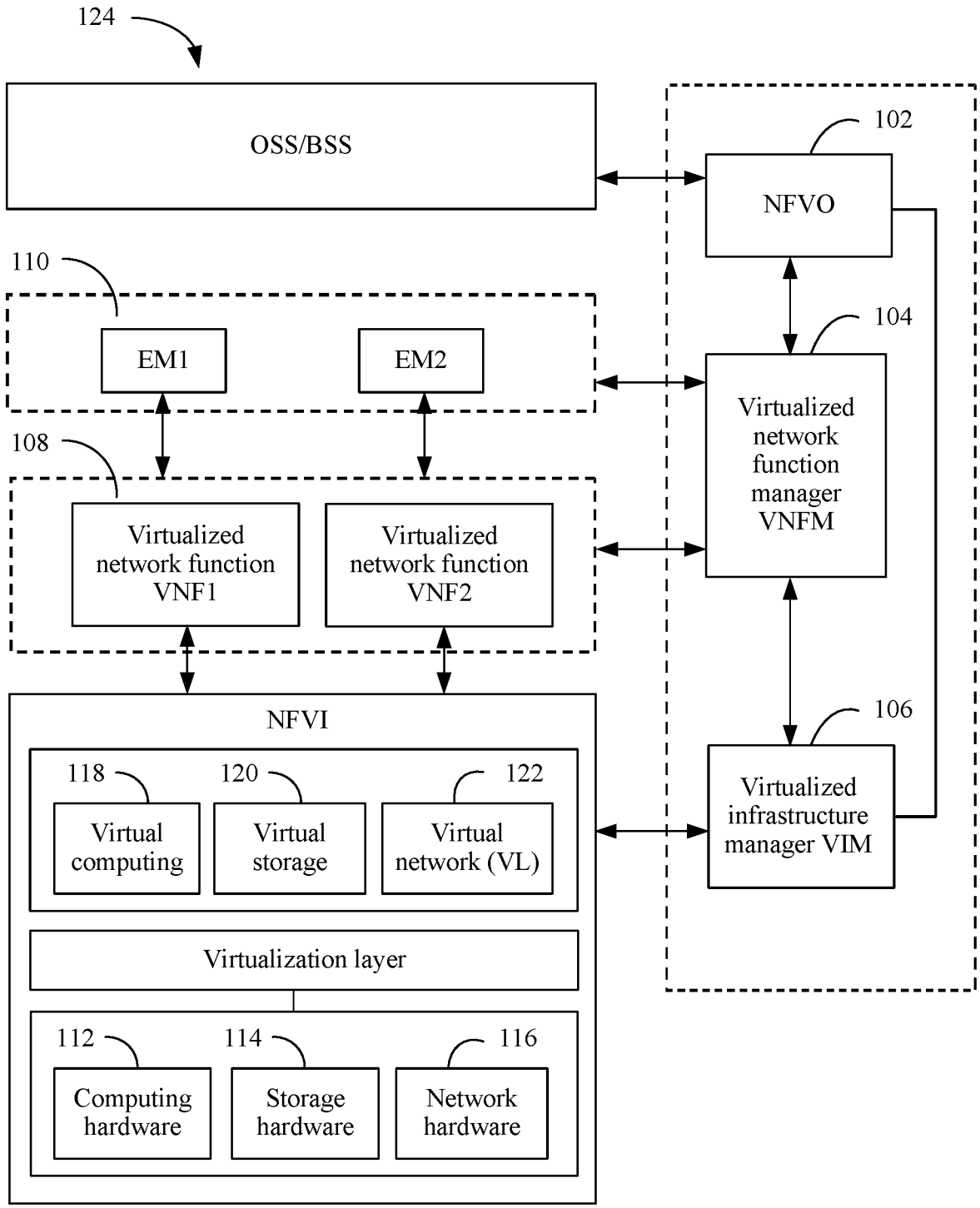
FIG. 1 is an architecture diagram of an NFV system according to an embodiment of the present invention.

To facilitate description of the service deployment method in the embodiments of the present invention, the following first describes a network system. The service deployment method in the embodiments of the present invention may be applied to the system. As shown in FIG. 1, FIG. 1 is a structural diagram of an NFV system 100 according to an embodiment of the present invention. The system 100 is configured to connect a CP on each VNF to a correct VL when an NS is deployed. Specifically, in this embodiment of the present invention, based on an existing NFV architecture, when an NSD is registered, connection requirement information of a VL to which each CP on each VNF needs to be connected is added to the NSD, and then, when the NS is deployed, each CP on each VNF is connected, according to the connection requirement information, to the VL to which the CP needs to be connected. Further, a type description of a port on each VL is added to the NSD. Correspondingly, the connection requirement information may further include a type of a port on the VL to which each CP on each VNF needs to be connected. Then, when the NS is deployed, the type of each port on the VL is configured according to the type description of the port on each VL, and each CP on each VNF is connected, according to the connection requirement information, to a port that is on the VL to which each CP needs to be connected and whose type is the same as the type.

Specifically, to achieve the objective of the present invention, a structural diagram provided in an embodiment of the present invention includes the following function components:

A NFV Orchestrator (NFVO) 102 is mainly responsible for life cycle management of a virtualized service, and allocation, scheduling, and the like of virtual resources in a virtual infrastructure and a network functions virtualization infrastructure (NFVI). The NFVO 102 may communicate with one or more Virtualized Network Function Manager (VNFM) 104, to execute a resource-related request, to send configuration information to the VNFM 104, and to collect status information of a VNF 108. In addition, the NFVO 102 may communicate with a Virtualized Infrastructure Manager (VIM) 106 to perform resource allocation and/or to reserve and exchange virtualized hardware resource configuration and status information.

The VNFM 104 is responsible for life cycle management of one or more VNFs 108, for example, instantiating, updating, querying, scaling, or terminating the VNF 108. The VNFM 104 may communicate with the VNF 108 to complete the life cycle management of each VNF and to exchange configuration and status information. There may be multiple VNFMs in the NFV architecture that are responsible for life cycle management of VNFs of different types. An NFVO 102 may select and determine different VNFMs 104 for different VNFs 108 according to types of services for which the VNFMs are responsible.

The VIM 106 controls and manages interaction between the VNF 108 and each of computing hardware 112, storage hardware 114, network hardware 116, virtual computing 118, virtual storage 120, and a virtual network 122. For example, the VIM 106 executes a resource management function, including management of an infrastructure resource, an allocation function (for example, adding a resource to a virtual container), and a running function (for example, collecting NFVI fault information). The VNFM 104 and the VIM 106 may communicate with each other to request resource allocation and to exchange virtualized hardware resource configuration and status information.

The virtual network 122 includes a VL for connecting the VNFs 108.

An NFVI is an infrastructure layer of the NFV, and includes a hardware component, a software component, or a combination thereof, to establish a virtualized environment to deploy, manage, and implement the VNF 108. A hardware resource layer and a virtualization layer are used to provide virtualized resources for the VNF 108, for example, a virtual machine and a virtual container in another form. A hardware resource includes the computing hardware 112, the storage hardware 114, and the network hardware 116. In an implementation, a resource of the computing hardware 112 and that of the storage hardware 114 may be centralized. The virtualization layer in the NFVI may abstract the hardware resource, and decouple the VNF 108 from an underlying physical network layer.

The multiple VNFs 108 are configured as virtualization of at least one network function. Each VNF runs in one virtual container, and is corresponding to one group of network functions that belong to one or more physical devices.

An equipment management (EM) system 110 is a system that is in a conventional telecommunications system and that is configured to configure and manage a device. In the NFV architecture, the EM system 110 may also be configured to: configure and manage the VNF 108, and initiate a life cycle management operation such as new VNF instantiation to the VNFM 104.

An Operations Support System and Business Support System (OSS/BSS) 124 supports various end-to-end telecommunications services. The OSS/BSS 124 registers a VNFD and an NSD with the NFVO 102, and initiates, to the NFVO 102, a request for instantiating an NS.

Figure 2:
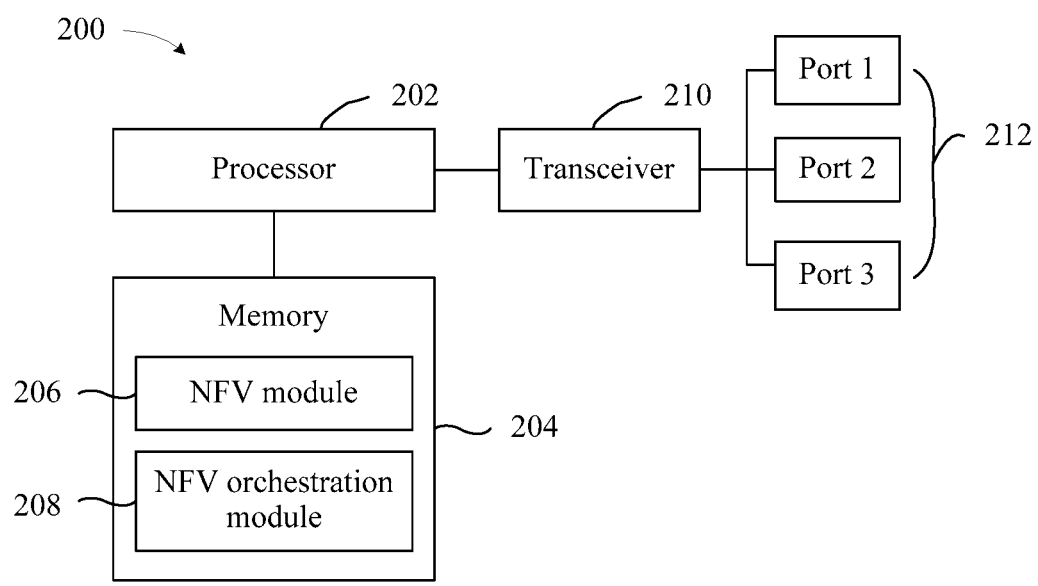
FIG. 2 is a structural diagram of a network element according to an embodiment of the present invention.

FIG. 2 is a schematic structural diagram of a network element according to an embodiment of the present invention. The network element is configured to transmit or process data in the NFV system 100 shown in FIG. 1. The network element 200 is configured to: create, modify, relocate, and/or migrate one or more virtual machines. The network element 200 may be further configured to: host, store, and/or execute one or more network functions. The network element 200 may be a subcomponent in the NFV system 100 shown in FIG. 1, for example, the NFVO 102, the VNFM 104, the VIM 106, or the OSS/BSS 124.

The network element 200 may include one or more ports 212 coupled to a transceiver 210. The transceiver 210 may be a transmitter, a receiver, or a combination thereof, and send or receive a data packet to or from another network node by using the port 212. A processor 202 is coupled to the transceiver 210, and is configured to: process a data packet, and determine specific nodes that are to send data packets. The processor 202 may include one or more multi-core processors. The processor 202 may be a general-purpose processor, an Application-Specific Integrated Circuit (ASIC), or a digital signal processor (DSP).

A memory 204 may be a non-transitory storage medium, be coupled to the processor 202, and be configured to store data of different types. The memory 204 may include a Read Only Memory (ROM), a Random Access Memory (RAM), or a dynamic storage device of another type that may store information and an instruction, or may be a disk memory. The memory 204 may be configured to store an instruction that implements an NFV system or a related method, for example, be used as the VNFM 104, the NFVO 102, the VIM 106, or the OSS/BSS 124. In an implementation, the memory 204 may include an NFV module 206. The NFV module may be executed on the processor 202. The NFV module 206 may be configured to host, store, and implement a network function of one or more virtualized network devices. In another implementation, the memory 204 may further include an NFV orchestration module 208 configured to create, modify, relocate, and/or migrate one or more virtual machines. It may be understood that, the network element 200 may be converted into a particular device, such as a router or a switch, by programming or loading an executable instruction to at least one of the processor 202, a cache, or a long term memory of the network element 200.

The network element 200 may implement functionality of one or more VNFs, and execute one or more instructions according to this embodiment of the present invention. The instructions may be stored in the memory 204, or may be integrated into a kernel or a plug-in of the kernel in an operating system of the network element 200.

In the architecture shown in FIG. 1, the NFVO 102 may be configured to: receive a registration request sent by the OSS/BSS 124 for registering descriptor of each VNF, VNFD, where the VNFD includes deployment information of each VNF; and store the VNFD of each VNF. Further, the NFVO 102 may receive a registration request sent by the OSS/BSS 124 for registering an NS descriptor, NSD, and store the NSD.

Figure 3:
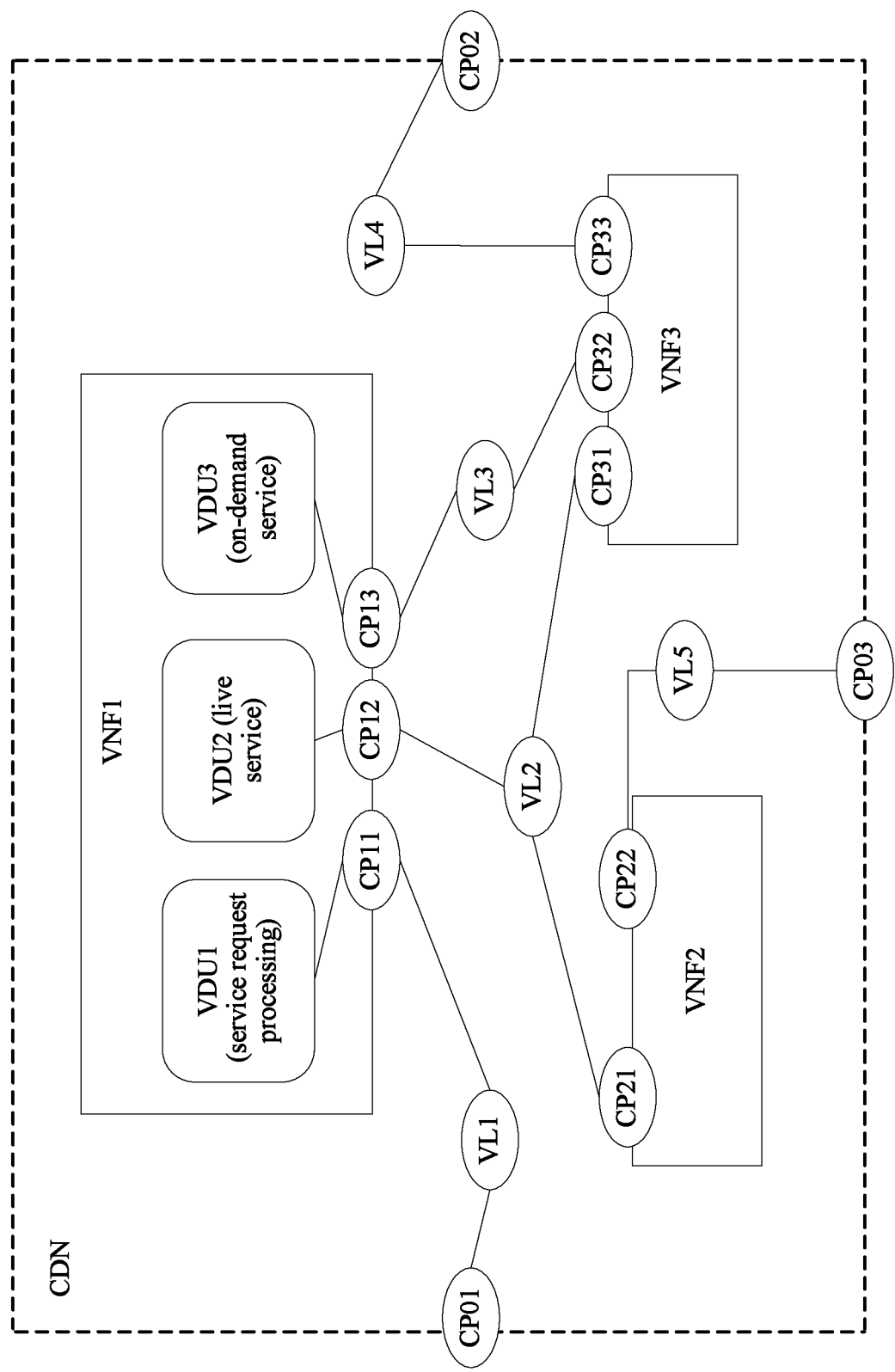
FIG. 3 is a schematic diagram of an NSD according to an embodiment of the present invention.

In an example, for the VNFD and the NSD stored by the NFVO 102, refer to FIG. 3. FIG. 3 is an instance diagram of an NSD of an NS whose name is a Content Delivery Network (CDN) according to an embodiment of the present invention. The CDN includes a VNF1, a VNF2, a VNF3, five VLs that are respectively a VL1 to a VL5, and three connection points (CP) for connecting to another NS or network element that are respectively a CP01, a CP02, and a CP03.

It can be learned from FIG. 3 that, the VL2 is used to connect the VNF1 and the VNF2, and connect the VNF1 and the VNF3, and the VL3 is used to connect the VNF1 and the VNF3. The VL1 is used to connect the VNF1 and the CP01, so that the VNF1 is connected to another external network element or NS. The VL4 is used to connect the VNF3 and the CP02, so that the VNF3 is connected to another external network element or NS. The VL5 is used to connect the VNF2 and the CP03, so that the VNF2 is connected to another external network or NS. The VNF1 includes three CPs, respectively a CP11, a CP12, and a CP13. The VNF2 includes two CPs, respectively a CP21 and a CP22. The VNF3 includes three CPs, respectively a CP31, a CP32, and a CP33. The CPs on the VNFs are separately connected to the VLs, so that each VNF is mutually connected to another VNF, another network element, or another NS by using the VLs, so as to form a complete NS.

The VNF1 further includes three VDUs, respectively a VDU1, a VDU2, and a VDU3. The VDU1 mainly receives a request (such as a live service request and an on-demand service request) from a user side. The VDU2 is configured to: receive a live service request forwarded by the VDU1, and process the request as a live service. The VDU3 is configured to: receive the on-demand service request forwarded by the VDU1, and process the request as an on-demand service. Specifically, interaction and communication between the VDUs in the VNF1 belong to the prior art. Details are not described herein in this embodiment of the present invention.

In an example, a video watching request from a user is received by using the CP01 and by using a CDN system in FIG. 3. The request is transmitted to the VDU1 in the VNF1 by using the VL1. The VDU1 may select another proper VDU in the VNF1 according to a type of a service to process the request. In this example, for example, when the user requests a live video service, the VDU1 sends the request to the VDU2, and then the VDU2 chooses, according to location information of the user and a network in which the user is located, to send the request to the VNF2 or the VNF3 by using the VL2 connected to the CP12, to provide the service for the user. When the user requests a service of demanding specific video content, the VDU1 sends the request to the VDU3, and then the VDU3 chooses, according to location information of the user and a network in which the user is located, to send the request to the VNF3 by using the VL3 connected to the CP13, to provide the service for the user. The VNF3 may provide the service for the user by using the VL5 and the CP03. The VNF3 provides the service for the user by using the VL4 and the CP02.

In this embodiment, to successfully deploy the CDN in FIG. 3, node information of each VNF in the NSD includes connection requirement information used to represent a VL to which each CP on each VNF needs to be connected.

In addition, a deployment template that is of each VNF included in the CDN system of FIG. 3 needs to be prestored in the NFVO. For example, a deployment template of the VNF1 may be described in Yet Another Markup Language (YAML) defined in the TOSCA standard. For example, the deployment template of the VNF1 is described by using a TOSCA service template, as shown in code (1).

```
Code (1):
    topology_template:                  #Topology template of the VNF1
        substitution_mappings:   #The substitution mappings element is used to
define an exposed feature of the template
            node_type: tosca.nodes.nfv.VNF.VNF1   #Expose a used node
type
            requirements:                       #Exposed connection requirement
                virtualLinkable:  [CP11  identifier,  virtualLinkable]     #The
required target exposed is an identifier of the CP11
                virtualLinkable:  [CP12  identifier,  virtualLinkable]     #The
required target exposed is an identifier of the CP12
                virtualLinkable:  [CP13  identifier,  virtualLinkable]     #The
required target exposed is an identifier of the CP13
        node_templates:                  #All node templates included in the VNF1
        ...
        CP11:                                #Node template of the CP11
            type: tosca.nodes.nfv.CP
            properties:  #Properties
                type:
                requirements: #Requirement information
            virtualbindable: VDU1          #The CP11 needs to be connected to the
VDU1
        CP12                                #Node template of the CP12
            type: tosca.nodes.nfv.CP
            properties:
                type:
                requirements:
            virtualbindable: VDU2          #The CP12 needs to be connected to
the VDU2
        CP13                                #Node template of the CP13
            type: tosca.nodes.nfv.CP
            properties:
                type:
                requirements:
            virtualbindable: VDU3          #The CP13 needs to be connected to the
VDU3
        ...
```

The substitution_mappings element defines the exposed feature of the VNF1. For example, node_type: tosca.nodes.nfv.VNF.VNF1 defines the type of the VNF1, that is, a type used in a VNF1 node template in an NSD described in code (2) by using TOSCA. Herein, requirements define an external requirement of the VNF1, that is, the VNF1 requires three connection points CPs connected to another VNF or a network element in another NS. Specifically, the three CPs on the VNF1 are respectively the CP11, the CP12, and the CP13. Exposed requirements of the three CPs are respectively the identifiers of the three CPs. In actual application, an identifier of a CP may be a port number of the CP, such as CP11, CP12, and CP13; or may be another identifier corresponding to a port number of each CP. For example, an exposed target of the CP11 is tag1, an exposed target of the CP12 is tag2, and an exposed target of the CP13 is tag3. When the exposed target is another identifier, and a service type represented by each CP is changed, provided that a correspondence between the CP and identification information of the CP is changed, a correspondence between each piece of identification information and a VL does not need to be changed. Therefore, this facilitates subsequent modification or maintenance of the NS.

Requirement information of the CP11 describes information that the CP11 is to be connected to the VDU1, and that a type of a connection between the two is virtualbindable. Requirement information of the CP12 describes information that the CP12 needs to be connected to the VDU2, and that a type of a connection between the two is virtualbindable. Requirement information of the CP13 describes information that the CP13 needs to be connected to the VDU3, and that a type of a connection between the two is virtualbindable.

It should be noted that only the node template related to this embodiment of the present invention is shown herein, and the rest part may be similar to that in the prior art, for example, the node templates of the VDU1, the VDU2, and the VDU3 may be the same as those in the prior art.

A deployment template of the NSD may be described in the YAML defined in the TOSCA standard. For example, the deployment template of the NS is described by using a TOSCA service template, as shown in code (2).

```
Code (2):
metadata:
         ID:                                              #Identifier of the NSD
    topology_template:        #Topology template of the service template
    node_templates:                  #All included node templates
    VNF1:                            #Node template of the VNF1
                         type: tosca.nodes.nfv.VNF.VNF1 #Type of the VNF 1,
where a definition derives from the deployment template of the VNF1 (code (1))
                         properties:            #Parameter included in the VNF1
                              Scaling_methodology:
                              Flavour_ID:
                              Threshold:
                              Auto-scale policy value:
                              Constraints:
                         requirements:                    #Connection requirement
information
                              virtualLinkable: #A type is a virtuallinkable type
                                   tag: Identifier of the CP11
    connection: VL1 #A target to which the CP11 is to be connected is the
VL1
         virtualLinkable:           #A type is a virtuallinkable type
              tag: Identifier of the CP12
                                        connection: VL2 #A target to which the CP12 is to
be connected is the VL2
         virtualLinkable:                 #A type is a virtuallinkable type
                                   tag: Identifier of the CP13
         connection: VL3 #A target to which the CP13 is to be connected is the
VL3
              VNF2:
                         type: tosca.nodes.nfv.VNF.VNF2
    ...
              VNF3:
                         type: tosca.nodes.nfv.VNF.VNF3
    ...
    CP01                 #endpoints of NS
    CP02                 #endpoints of NS
    CP03                 #endpoints of NS
    VL1 #Node template of the VL1
                         type: tosca.nodes.nfv.VL.Eline
                         properties:
                    capabilities: #Capability parameter
                              virtualLinkable #A type is virtuallinkable
                                   occurrences: 2 #Port quantity
         VL2
                         type: tosca.nodes.nfv.VL.Etree
                         properties:
                         capabilities:
                              virtualLinkable
                                   occurrences: 5
         VL3
                         type: tosca.nodes.nfv.VL.Eline
                         properties:
                              capabilities:
                                   virtualLinkable
                                        occurrences: 2
```

```
    VL4
            type: tosca.nodes.nfv.VL.Eline
                properties:
            capabilities:
                    virtualLinkable
                        occurrences: 2
    VL5
            type: tosca.nodes.nfv.VL.Eline
                properties:
            capabilities:
                    virtualLinkable
                        occurrences: 2
```

In the code (2), the requirements element of the VNF1 defines connection requirement information of the VNF1 for being connected to the external. In this embodiment, for each requirement whose type is virtualLinkable, two new parameters are added:

tag: is corresponding to the identifier of the exposed CP of the virtualLinkable type in requirements in substitution_mappings defined in the service template (VNFD) of the VNF1 in the code (1); and connection: is corresponding to the target VL that needs to be connected to.

For example, in the code (2), the node information (node template) of the VNF1 specifically describes information that, the CP11 is to be connected to the VL1, the CP12 is to be connected to the VL2, the CP13 is to be connected to the VL3, and all connection types are virtualLinkable.

Optionally, in actual application, at least two VLs may be of different types. For example, the VL2 is a virtual link of a tree mode (E-TREE) type, and the VL3 is a virtual link of a bus mode (E-LAN) type different from the tree mode type. A VL of a tree mode type is a point-to-multipoint connection type, a root port and a leaf port are defined in the type, and the root port may send a message to any leaf port, but the leaf port can send a message only to the root port, and the leaf ports cannot send messages to each other. Therefore, types of multiple ports on the VL2 are not completely the same.

In the NSD, when port types of at least two ports on the VL are different, the node information of the VL may further include a type of the port on the VL. For example, the CDN shown in FIG. 3 is still used as an example. The VNF1 may send a message to the VNF2 and the VNF3, and each of the VNF2 and the VNF3 may send a message to the VNF1, but the VNF2 and the VNF3 cannot communicate with each other. Therefore, in a case similar to this case, a type of each port may be described in the node information of the VL with the ports of different types. The node information of the VL2 is shown in code (3).

```
    Code (3):
    VL2 #Node template of the VL2
            type: tosca.nodes.nfv.VL.Etree #Node type of the VL2
                properties:
                    capabilities: #Capability parameter
                    virtualLinkable
                        type:leaf #A port type is a leaf port
                        Bandwidth: 100k #A bandwidth is 100 k
                        occurrences: 5 #A quantity is 5
                    virtualLinkable
                        type:root #A port type is a root port
                        Bandwidth: 300k #A bandwidth is 300 k
                        occurrences: 3 #A quantity is 3
```

In the node template of the VL2, a new parameter type is added to the capability parameter, and is used to represent ports of different types. The port type is, for example, root and leaf. Certainly, alternatively, for another VL type, the port type may be another type.

Optionally, for the port, other port features such as bandwidth (Bandwidth) and quantity (occurrences) parameters may be further added. For example, a bandwidth of a port whose port type is root may be 300 k, and a quantity of ports may be 3. A bandwidth of a port whose port type is leaf may be 100 k, and a quantity of ports may be 5.

Correspondingly, the connection requirement information in the node information of the VNF1 further includes a type of a port on a VL to which each CP needs to be connected. For example, the node information of the VNF1 in the NSD may be described by using code (4).

```
    Code (4):
    metadata:
        ID:                     #Identifier of the NSD
        topology_template:      #Topology template of the NSD
            node_templates:     #All node templates included in the NSD
        VNF1:                   #Node template of the VNF1
                type: tosca.nodes.nfv.VNF.VNF1 #Definition of the type,
    deriving from the service template of the VNF1 in the code (1)
                properties:
                    Scaling_methodology:
                    Flavour_ID:
                    Threshold:
                    Auto-scale policy value:
                    Constraints:
                requirements:
                    virtualLinkable:
                        tag: Identifier of the CP11
                        connection:  get_target (VL1, leaf) #A connection
    target of the CP11 is a port whose type is leaf and that is on the VL1
                    virtualLinkable:
                        tag: Identifier of the CP12
                        connection: get_target (VL2, root) #A connection
    target of the CP12 is a port whose type is root and that is on the VL2
                    virtualLinkable:
                        tag: Identifier of the CP13
                        connection: VL3 #A connection target of the CP13 is
    any port on the VL3
```

Different from the code (2), in the code (4), the connection requirement information in the node information of the VNF1 further includes the type of the port on the VL to which each CP needs to be connected. For example, the CP11 needs to be connected to a port whose type is leaf and that is on the VL1, and the CP12 needs to be connected to a port whose type is root and that is on the VL1. The CP13 only needs to be connected to any port on the VL3 because types of all ports on the VL3 are the same.

Therefore, by using the method in this embodiment, the node information of the VNF in the NSD clearly describes information that which CP on each VNF is to be connected to a port of which type on which VL. Because features of the ports are different, it can be ensured that a service is correctly executed.

In addition, although only the node information of the VNF1 and the VL2 and the VNFD of the VNF1 are described, other VNFs and VLs are similar to this, and therefore are not be described.

In actual application, the NSD and the VNFD may be described in other languages, and are not specifically limited in the present invention.

Figure 4A:
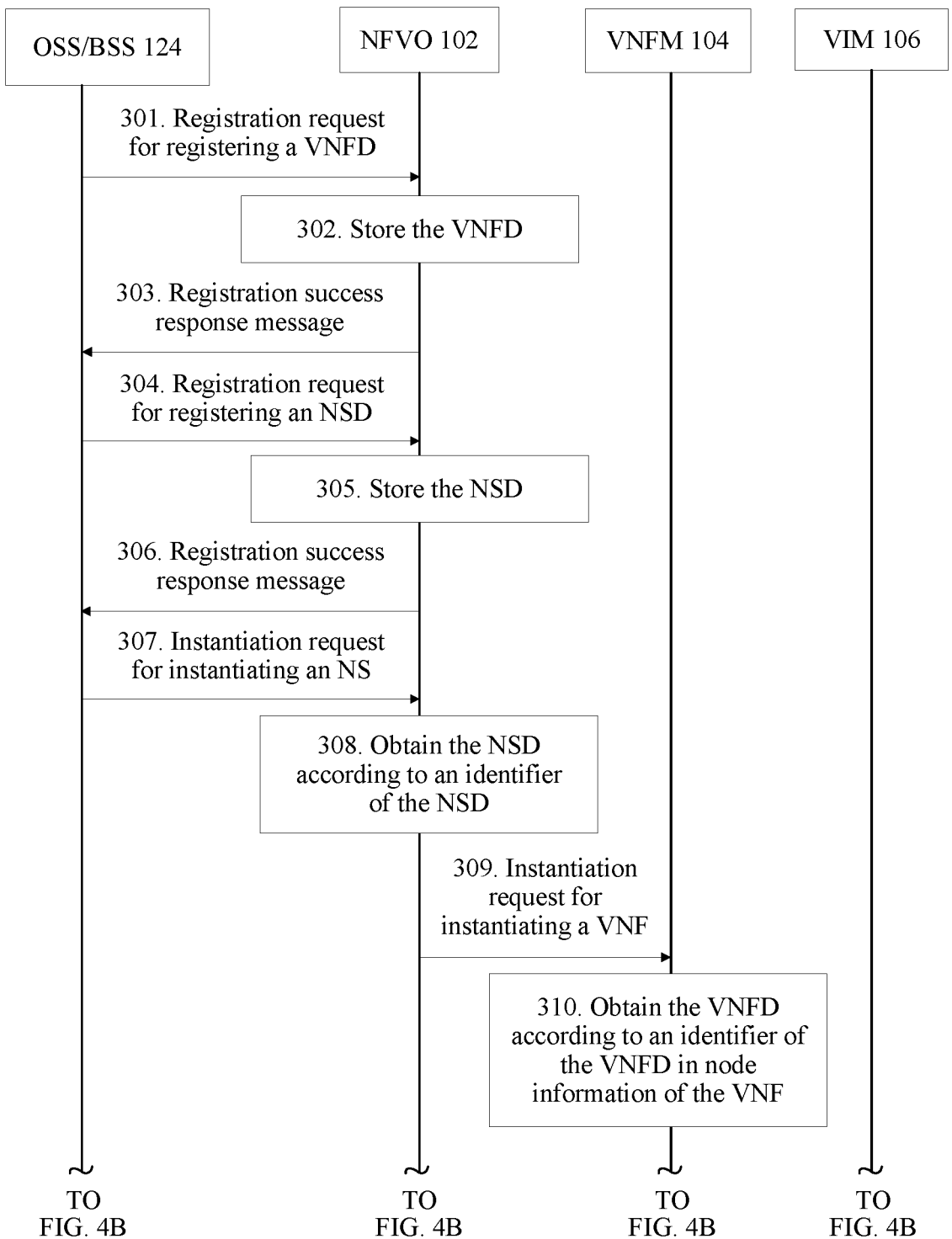
FIG. 4A and FIG. 4B are a flowchart of a service deployment method according to an embodiment of the present invention.
Figure 4B:
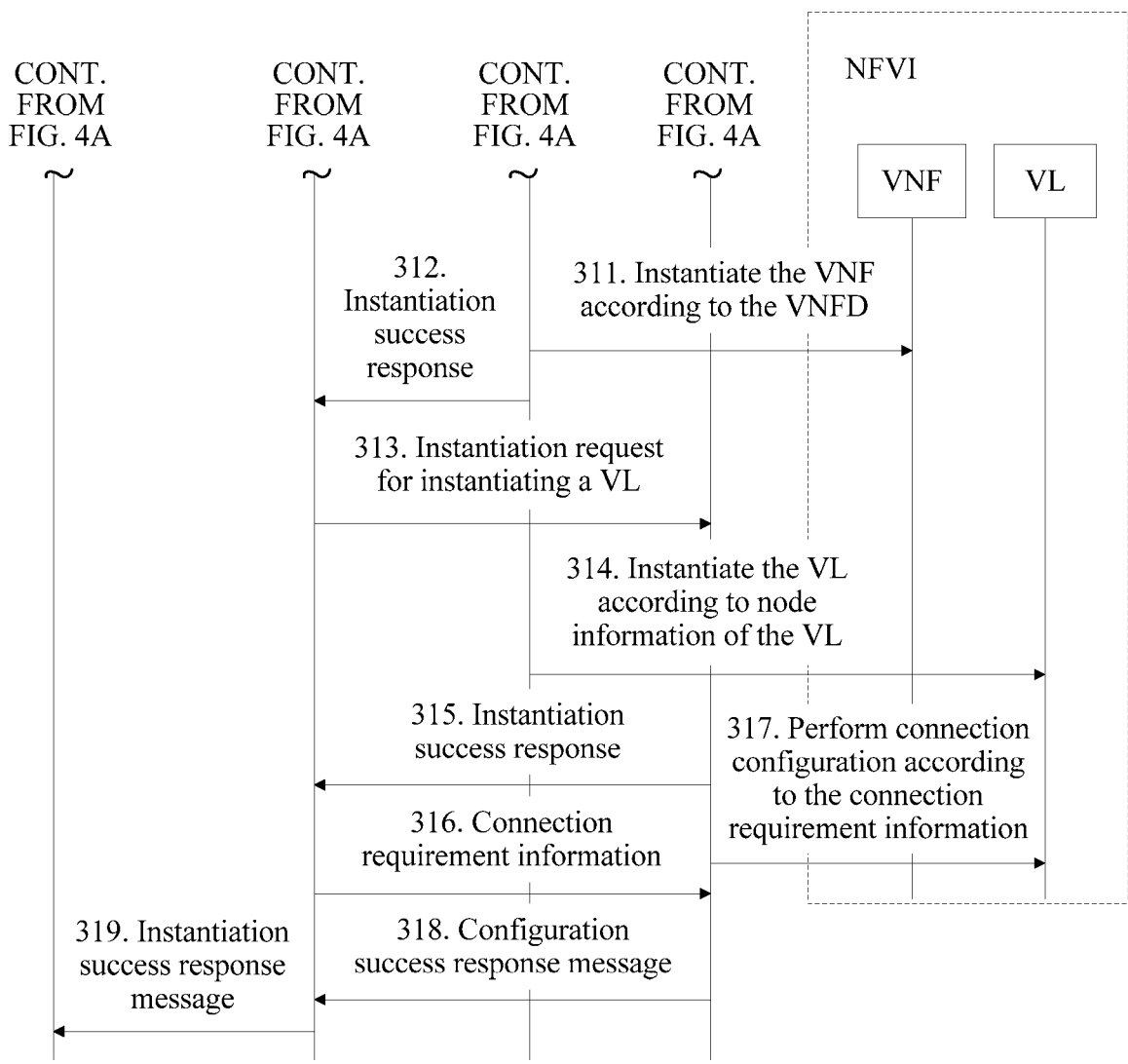

Then referring to FIG. 4A and FIG. 4B, FIG. 4A and FIG. 4B are a flowchart of a service deployment method according to an embodiment of the present invention. The method includes the following steps.

Step 301: An OSS/BSS 124 sends, to an NFVO 102, a registration request for registering an VNFD, where the VNFD includes deployment information of the VNF.

Specifically, before deploying the CDN system shown in FIG. 3, the OSS/BSS 124 needs to separately send, to the NFVO 102, registration requests for a VNF1, a VNF2, and a VNF3. Each of the registration requests includes deployment information of the VNF, that is, a VNFD. For example, the registration request for the VNF1 carries deployment information VNFD1 of the VNF1, the registration request for the VNF2 carries deployment information VNFD2 of the VNF2, and the registration request for the VNF3 carries deployment information VNFD3 of the VNF3.

Specifically, the deployment information of each VNF may include an identifier of the VNF, an identifier of a CP on the VNF, and a connection relationship between each CP on the VNF and a VDU in the VNF. Further, for the deployment information of each VNF, refer to the related description of the code (1). Details are not described herein in this embodiment of the present invention.

Optionally, the OSS/BSS 124 may send only one registration request to the NFVO 102. The registration request includes the deployment information of the VNF1, the VNF2, and the VNF3.

A specific form of the registration request for the VNF is not limited in this embodiment of the present invention.

Step 302: The NFVO 102 stores a VNFD of each VNF.

Specifically, the NFVO 102 stores the VNFD of each VNF in the NFVO 102 according to the registration request in step 301.

Step 303: The OSS/BSS 124 receives a registration success response message returned by the NFVO 102.

The deployment information of each VNF is stored in the NFVO 102 by performing step 301 to step 303.

Step 304: The OSS/BSS 124 sends, to the NFVO 102, a registration request for registering an NSD, where the NSD includes node information of at least two VNFs and node information of at least two VLs, the at least two VLs are used to connect the at least two VNFs, a quantity of CPs on each VNF is greater than or equal to 2, the node information of each VNF includes connection requirement information used to represent a VL to which each CP on each VNF needs to be connected, the connection requirement information is used to determine, in a process of instantiating the NS, the VL to which each CP on each VNF is to be connected, and the VNFD of each VNF is stored in the NFVO 102 by performing step 301 to step 303.

Specifically, before deploying the CDN shown in FIG. 3, the OSS/BSS 124 needs to send a registration request for the CDN to the NFVO 102. The registration request for the CDN includes node information of the VNF1, the VNF2, and the VNF3, for example, includes identifiers of the VNF1, the VNF2, and the VNF3, connection requirement information of each CP on each VNF and a VL (for example, a CP11 is to be connected to a VL1), and node information of each virtual link, such as identifiers of a VL1 to a VL5.

Further, if ports on the VL are of different types, the registration request for the NS further includes a type of a port on the VL. Correspondingly, the connection requirement information further includes a type of a port on the VL to which each CP needs to be connected, and the type of the port is used to determine, in the process of instantiating the NS, the type of the port on the VL to which each CP on each VNF is to be connected.

Specifically, for the NSD that is included in registration information of the NS, refer to the related description of the code (2). Details are not described herein in this embodiment of the present invention.

Step 305: The NFVO 102 stores the NSD.

Step 306: The OSS/BSS 124 receives a registration success response message returned by the NFVO 102.

The NSD of the NS may be stored in the NFVO 102 by performing step 304 to step 306.

It should be noted that there is no strict time sequence between steps 301 to 303 and steps 304 to 306. The OSS/BSS 124 and the NFVO 102 may perform steps 301 to 303 before steps 304 to 306, or may perform steps 304 to 306 before steps 301 to 303. This is not limited in this embodiment of the present invention.

After the OSS/BSS 124 stores the VNFD and the NSD in the NFVO 102, the OSS/BSS 124 may request to instantiate the NS, that is, request to perform specific service deployment on the NS. Still referring to FIG. 4A and FIG. 4B, that a system completes the service deployment on the NS includes the following steps.

Step 307: The NFVO 102 receives an instantiation request for instantiating the NS, where the instantiation request includes an identifier of the NSD, for example, a value of an ID parameter defined in metadata in the code (4). The NS is, for example, the CDN in FIG. 3.

Step 308: The NFVO 102 obtains the NSD according to the identifier of the NSD.

In an example, the NFVO 102 obtains, according to the identifier of the NSD, the NSD stored in the NFVO 102 in step 305.

Step 309: The NFVO 102 sends, to a VNFM 104, an instantiation request for instantiating the VNF, where the instantiation request includes node information of the VNF. The node information of the VNF includes an identifier of the VNF.

For example, in the example shown in FIG. 3, the NFVO 102 separately sends instantiation requests for the VNF1, the VNF2, and the VNF3 to the VNFM 104 for instantiation. It should be noted that the VNF1, the VNF2, and the VNF3 may be managed by different VNFMs 104. In this step, the NFVO 102 sends, to the VNFMs that manage the respective VNFs, the requests for instantiating the VNFs. In this step, the VNFM 104 is merely a collective term of a VNFM, and is not limited to one VNFM.

Step 310: The VNFM 104 obtains the VNFD according to the identifier of the VNF that is in the node information of the VNF. In the NSD and the VNFD described by using the TOSCA standard, the identifier of the VNF is, for example, a node type defined in a node template of the VNF. For example, the node type in the node template of the VNF1 in the code (1) is tosca.nodes.nfv.VNF.VNF1.

That the VNFM 104 obtains the VNFD according to the identifier of the VNF that is in the node information of the VNF belongs to the prior art. Details are not described herein in this embodiment of the present invention.

Further, the node information obtained by the VNFM 104 according to the identifier of the VNF in this step includes the identifier of the VNF, a connection point CP that is on the VNF and needs to be connected to another VNF or a network element in another NS, an identifier of each connection point, a VDU included in the VNF, and a connection relationship between each CP and a VDU. Specifically, for the node information, refer to the related description of the code (1). Details are not described herein in this embodiment of the present invention.

Step 311: The VNFM 104 instantiates the VNF according to the VNFD.

It should be noted that, after the instantiation succeeds, the VNFM 104 configures the CP on the VNF according to the identifier of the CP, that is, binds the identifier of the CP to the corresponding CP; and sends an instantiation success response message to the NFVO 102 after the instantiation succeeds.

It should be noted that if the identifier of the CP is another identifier corresponding to a port number of the CP, after instantiating the VNF, the VNFM 104 configures each CP by using another identifier of the CP.

For example, the VNF1 is used as an example. An identifier of a CP11 exposed in substitution_mappings in the VNFD is tag1, an identifier of a CP12 is tag2, and an identifier of a CP13 is tag3.

Therefore, binding configuration is performed on the CP11 and tag1, binding configuration is performed on the CP12 and tag2, and binding configuration is performed on the CP13 and tag3.

Step 312: The NFVO 102 receives an instantiation success response message returned by the VNFM 104.

Step 313: The NFVO 102 sends, to a VIM 106, an instantiation request for instantiating the VL.

The instantiation request includes node information of VLs that is included in the NSD. This step may be performed with step 310 at the same time, or may be performed before or after step 310. The node information of the VL includes a type of the VL, or includes both a type of the VL and a type of a port on the VL. For example, in the example shown in FIG. 3, the NFVO 102 sends node information of the VL1, the VL2, the VL3, the VL4, and the VL5 to the VIM 106. The VL2 is used as an example. The node information of the VL2 includes a type of the VL, such as a type described in type: tosca.nodes.nfv.VL.Etree in the code (3). The node information of the VL2 further includes a type of a port on the VL, such as a type of a port described in type: leaf; type: root in the code (3).

Step 314: The VIM 106 instantiates the VL according to the node information of the VL, and configures a port on the VL according to a type of the port on the VL in an instantiation process.

Specifically, in the example in FIG. 3, the NFVO 102 sends the node information of the VL1, the VL2, the VL3, the VL4, and the VL5 to the VIM 106. The VL2 is used as an example for description. Referring to the code (3), it is determined, according to the type of the VL2: tosca.nodes.nfv.VL.Etree, that the VL that needs to be instantiated is a VL of an E-TREE type, and it may be determined, according to the type of the port, that there are two port types, respectively a leaf port and a root port.

Figure 5:
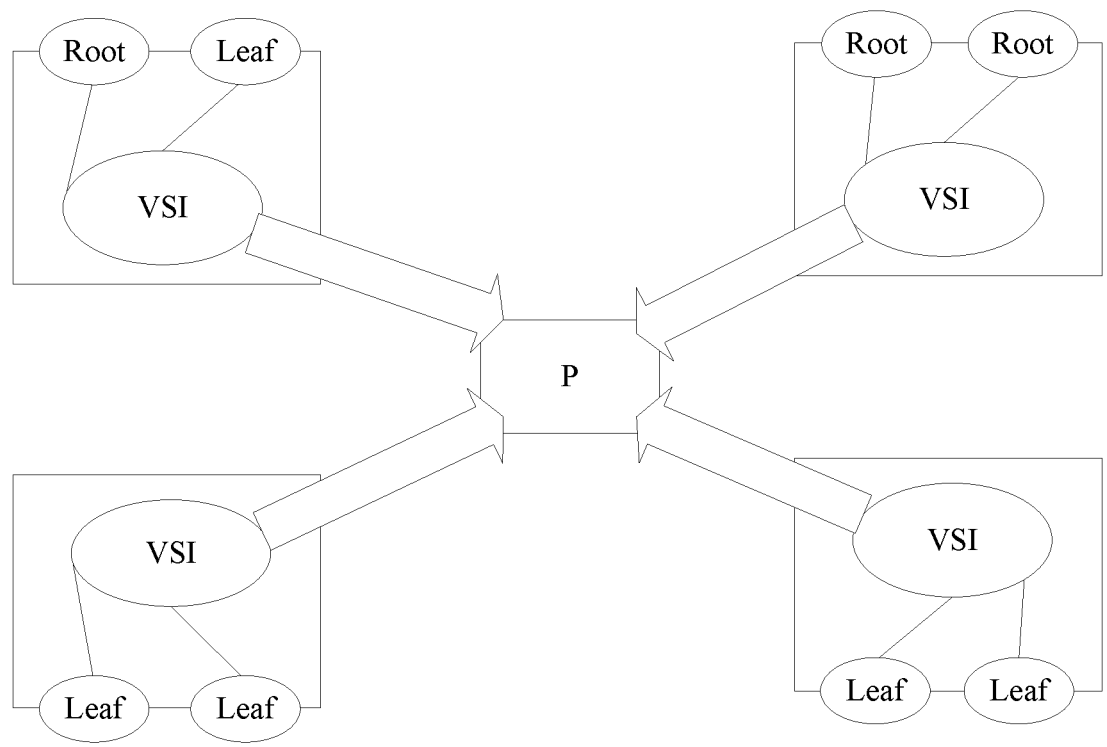
FIG. 5 is a schematic diagram of a virtual link according to an embodiment of the present invention.

Referring to FIG. 5, FIG. 5 is a schematic diagram of instantiating a tree-mode VL2. Herein, P represents a central router, and VSI represents a virtual switch on an edge. In this example, the tree-mode VL is implemented by connecting the central router and multiple virtual switches. Specifically, by performing configuration on the central router, communication between leaf ports is shielded, and communication between a root port and a leaf port is ensured. For example, on the central router, for an ingress of a root port, all other ports may be configured as egress ports; but for an ingress of a leaf port, a port corresponding to a root port may be configured as an egress port, and ports corresponding to other leaf ports are not configured as egress ports.

Port information of the VL that needs to be instantiated is determined according to a parameter in capabilities. A type parameter in the port information is a newly added parameter in the present invention, and is used to determine the type of the port, for example, a leaf port or a root port. A bandwidth parameter in the port information is also a newly added parameter in the present invention, and is used to determine a bandwidth required by a corresponding port. An occurrences parameter in the port information is used to determine a quantity of ports of different types. For example, in the description of the VL2, the VL2 has two virtualLinkable capabilities, that is, both may be used to connect the CP on the VNF. A type of one is leaf, an occurrences parameter is 5, and a bandwidth is 100 k. A type of the other is root, an occurrences parameter is 3, and a bandwidth is 300 k. This indicates that, the VL that needs to be instantiated needs to have five leaf nodes, and a bandwidth of each node is set to 100 K; and further requires three root nodes, and a bandwidth of each node is set to 300 K.

Step 315: The NFVO 102 receives an instantiation success response message returned by the VIM 106.

Step 316: The NFVO 102 sends the connection requirement information to the VIM 106.

In actual application, the NFVO 102 may send only the connection requirement information, or may send the NSD to the VIM 106.

The connection requirement information describes the VL to which each CP on the VNF needs to be connected. For example, in the example shown in FIG. 3, the NFVO 102 separately or simultaneously sends, to the VIM 106, the connection requirement information of VLs to which CPs on each of the VNF1, the VNF2, and the VNF3 need to be connected. For example, the CP11 of the VNF1 needs to be connected to the VL1, the CP12 of the VNF1 needs to be connected to the VL2, and the CP13 of the VNF1 needs to be connected to the VL3. For details, refer to the code (2), and requirements in the node information of the VNF1 describe the connection requirement information.

Step 317: The VIM 106 performs connection configuration according to the connection requirement information.

For example, the VNF1 and the VL2 are used as an example. Referring to the code (4), which CP on the VNF1 is to be connected to a port of which type on which VL is described in the node information of the VNF1. The VIM 106 connects the CP12 to one of root ports on the instantiated VL2 in FIG. 5, connects the CP11 to any leaf port on the instantiated VL1, and connects the CP13 to any port on the instantiated VL3.

Step 318: After successfully performing connection configuration, the VIM 106 may return a configuration success response message to the NFVO 102.

Step 319: The NFVO 102 returns an NS instantiation success response message to the OSS/BSS 124. At this point, a procedure for instantiating the NS is completed.

It should be noted that in the foregoing description, the OSS/BSS 124 is a service request device, and the NFVO 102 is a service provision device. In actual application, the service request device may be a device in another form, and the service provision device may be a device in another form. This is not specifically limited in the present invention.

It can be learned from the foregoing description that, in this embodiment of the present invention, because the connection requirement information of the VL to which each CP on each VNF needs to be connected is clearly described in the node information of the VNF in the NSD, in the subsequent process of instantiating the NS, each CP may be connected, according to the connection requirement information, to the VL to which the CP needs to be connected, so that it is ensured that a service can be correctly executed.

Further, the connection requirement information may include the type of the port to which each CP needs to be connected. Because features of ports on some VLs are different, by using the method, during subsequent NS instantiation, each CP may be connected, according to the connection requirement information, to a port that is on a VL and whose type is the same as the type of the port to which the CP needs to be connected, so that it can be further ensured that the service can be correctly executed.

Optionally, a network element 200 may be some or all elements in FIG. 1, so as to implement some or all of the steps in the method shown in FIG. 3. A specific configuration may be determined according to an actual requirement.

Specifically, when the network element 200 is the NFVO 102, and when a processor 202 executes an instruction included in computer executable program code stored in a memory 204, the instruction enables the network element 200 to perform the following operations: receiving, by using a transceiver 210, an instantiation request for instantiating a network service NS, where the instantiation request includes an identifier of NSD; obtaining the NSD according to the identifier of the NSD, where the NSD includes node information of at least two virtualized network functions VNFs and node information of at least two virtual links VLs, a quantity of connection points CPs on the VNF is greater than or equal to 2, and the node information of the VNF includes an identifier of the VNF and connection requirement information used to represent a VL to which each CP on the VNF needs to be connected; sending the node information of the VNF to the VNFM 104 by using the transceiver 210; sending the node information of the VL to the VIM 106 by using the transceiver 210; separately receiving, by using the transceiver 210, an instantiation success response message returned by the VNFM 104 and that returned by the VIM 106; and sending the connection requirement information to the VIM 106 by using the transceiver 210.

Further, for specific implementations of the operations performed by the processor 202 included in the network element used as the NFVO 102, refer to the corresponding steps performed by the NFVO 102 in the embodiments in FIG. 1, FIG. 4A, and FIG. 4B. Details are not described herein in this embodiment of the present invention.

In another optional manner, when a network element 200 is the VIM 106, and when a processor 202 executes an instruction included in computer executable program code stored in a memory 204, the instruction enables the network element 200 to perform the following operations: receiving, by using a transceiver 210, connection requirement information that is of connection points CPs on a virtualized network function VNF and the at least two VLs and that is sent by the NFVO 102, where the connection requirement information includes a VL to which each CP needs to be connected; and connecting, according to the connection requirement information, each CP to the VL to which the CP needs to be connected.

Further, for specific implementations of the operations performed by the processor 202 included in the network element used as the VIM 106, refer to the corresponding steps performed by the VIM in the embodiments in FIG. 1, FIG. 4A, and FIG. 4B. Details are not described herein in this embodiment of the present invention.

In another optional manner, when a network element 200 is the OSS/BSS 124, and when a processor 202 executes an instruction included in computer executable program code stored in a memory 204, the instruction enables the network element 200 to perform the following operations: sending, to a service provision device by using a transceiver 210, a registration request for registering an NSD, where the NSD includes node information of at least two virtualized network functions VNFs and node information of at least two virtual links VLs, a quantity of connection points CPs on the VNF is greater than or equal to 2, the node information of the VNF includes connection requirement information used to represent a VL to which each CP on the VNF needs to be connected, and the connection requirement information is used to determine, in a process of instantiating the NS, the VL to which each CP on the VNF is to be connected; and receiving, by using the transceiver 210, a registration success response message returned by the service provision device.

For specific implementations of the operations performed by the processor 202 included in the network element used as the OSS/BSS 124, refer to the corresponding steps performed by the OSS/BSS 124 (the service request device) in the embodiments in FIG. 1, FIG. 4A, and FIG. 4B. Details are not described herein in this embodiment of the present invention.

Figure 6:
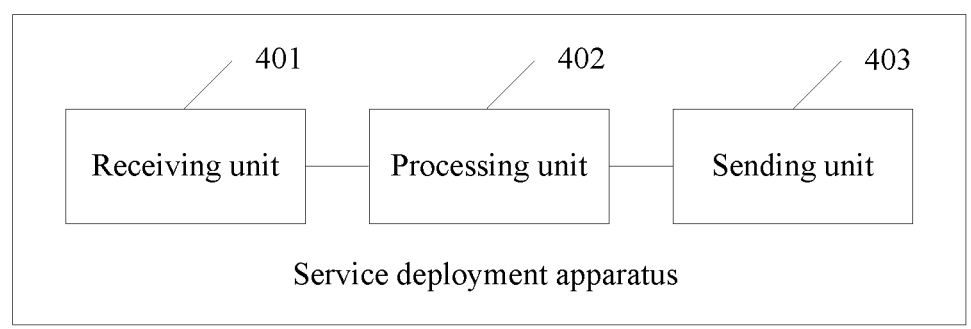
FIG. 6 is a function block diagram of a first service deployment apparatus according to an embodiment of the present invention.

FIG. 6 is a simplified function block diagram of a first service deployment apparatus according to an embodiment of the present invention. The service deployment apparatus includes a receiving unit 401, a processing unit 402, and a sending unit 403.

The receiving unit 401 is configured to receive an instantiation request for instantiating a network service NS. The instantiation request includes an identifier of NSD. The processing unit 402 is configured to obtain the NSD according to the identifier of the NSD. The NSD includes node information of at least two virtualized network functions VNFs and node information of at least two virtual links VLs, a quantity of connection points CPs on the VNF is greater than or equal to 2, and the node information of the VNF includes an identifier of the VNF and connection requirement information used to represent a VL to which each CP on the VNF needs to be connected. The sending unit 403 is configured to: send the node information of the VNF to a VNFM 104, and send the node information of the VL to a VIM 106. The receiving unit 401 is further configured to separately receive an instantiation success response message returned by the VNFM 104 and that returned by the VIM 106. The sending unit 403 is further configured to send the connection requirement information to the VIM 106.

Further, the receiving unit 401 is further configured to perform step 301, step 304, and step 318 performed by the NFVO 102 in FIG. 4A and FIG. 4B. The processing unit 402 is further configured to perform step 302, step 305, and step 308 performed by the NFVO 102 in FIG. 4A and FIG. 4B. The sending unit 403 is further configured to perform step 303, step 306, and step 319 performed by the NFVO 102 in FIG. 4A and FIG. 4B.

Figure 7:
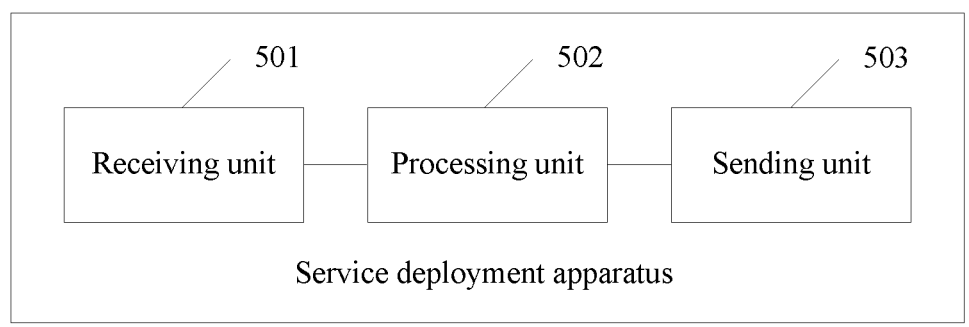
FIG. 7 is a function block diagram of a second service deployment apparatus according to an embodiment of the present invention.

FIG. 7 is a simplified function block diagram of a second service deployment apparatus according to an embodiment of the present invention. The service deployment apparatus includes a receiving unit 501, a processing unit 502, and a sending unit 503.

Specifically, the receiving unit 501 is configured to receive connection requirement information that is of each connection point CP on a virtualized network function VNF and the at least two VLs and that is sent by an NFVO 102.

The connection requirement information includes a VL to which each CP needs to be connected. The processing unit 502 is configured to connect, according to the connection requirement information, each CP to the VL to which the CP needs to be connected.

Optionally, the connection requirement information further includes a type of a port on the VL to which each CP needs to be connected, and the processing unit 502 is configured to connect, according to the connection requirement information, each CP to a port that is on the VL to which the CP needs to be connected and whose type is the same as the type.

Optionally, the receiving unit 501 is further configured to: before receiving the connection requirement information, receive an instantiation request sent by the NFVO 102 for instantiating the VL. The instantiation request includes node information of the VL, the node information of the VL includes a type of the VL and a type of a port on the VL, and port types of at least two ports on the VL are different. The processing unit 502 is further configured to: instantiate the VL according to the node information of the VL, and configure the port on the VL according to the type of the port on the VL when instantiating the VL. The sending unit 503 is configured to send an instantiation success response message to the NFVO 102.

Figure 8:
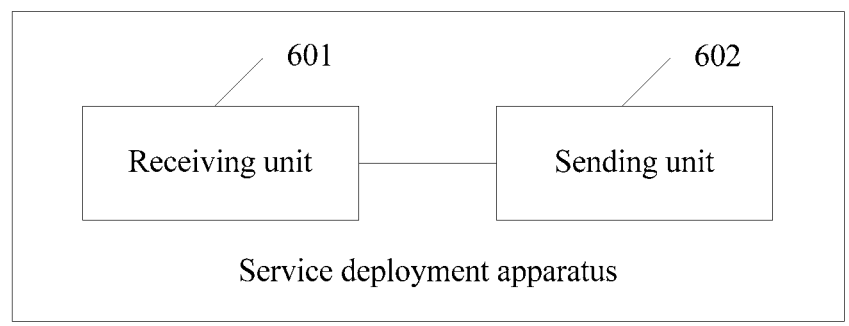
FIG. 8 is a function block diagram of a third service deployment apparatus according to an embodiment of the present invention.

FIG. 8 is a simplified function block diagram of a third service deployment apparatus according to an embodiment of the present invention. The service deployment apparatus includes a receiving unit 601 and a sending unit 602.

Specifically, the sending unit 602 is configured to send, to a service provision device, a registration request for registering an NSD. The NSD includes node information of at least two virtualized network functions VNFs and node information of at least two virtual links VLs, a quantity of connection points CPs on the VNF is greater than or equal to 2, the node information of the VNF includes connection requirement information used to represent a VL to which each CP on the VNF needs to be connected, and the connection requirement information is used to determine, in a process of instantiating the NS, the VL to which each CP on the VNF is to be connected. The receiving unit 601 is configured to receive a registration success response message returned by the service provision device.

Further, the receiving unit 601 is further configured to perform step 303 and step 319 performed by the OSS/BSS 124 in FIG. 4A and FIG. 4B. The sending unit 602 is further configured to perform step 301 performed by the OSS/BSS 124 in FIG. 4A and FIG. 4B.

It should be noted that the service deployment apparatus is displayed in a form of a functional unit. Without limitation, the term "unit" used in this specification may be an application-specific integrated circuit (ASIC), an electronic circuit, a (shared, dedicated, or group) processor and a memory that can execute one or more software or firmware programs, a combinatorial logic circuit, and/or another proper component that provides the function.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A network service deployment method, comprising:
obtaining, by a network functions virtualization orchestrator (NFVO), a network service descriptor (NSD) of a network service (NS), wherein the NSD comprises node information of a virtualized network function (VNF) and node information of at least two virtual links (VLs) that connect different VNFs, a quantity of connection points (CPs) on the VNF is greater than or equal to 2, the node information of the VNF comprises identifier of a virtualized network function descriptor (VNFD) and connection requirement information that indicates that a CP on the VNF is to be connected to a port on a VL in the at least two VLs during instantiating the NS;
receiving, by a virtualized network function manager (VNFM), the node information of the VNF;
instantiating, by the VNFM, the VNF according to the node information of the VNF;
receiving, by a virtualized infrastructure manager (VIM), the node information of the at least two VLs and the connection requirement information;
instantiating, by the VIM, the at least two VLs according to the node information of the at least two VLs; and connecting, by the VIM, the CP on the VNF to the port on the VL in the at least two VLs according to the connection requirement information;

wherein the connection requirement information comprises a correspondence between the CP on the VNF and information of the port on the VL.

2. The method according to claim 1, wherein the information of the port on the VL is a type of the port on the VL.

3. A network service deployment method, comprising:
receiving, by a virtualized infrastructure manager (VIM), node information of at least two virtual links (VLs) that connect different VNFs and connection requirement information that indicates that a connection point (CP) on a virtualized network function (VNF) is to be connected to a port on a VL in the at least two VLs during instantiating a network service, wherein a quantity of CPs on the VNF is greater than or equal to 2;
instantiating, by the VIM, the at least two VLs according to the node information of the at least two VLs; and
connecting, by the VIM, the CP on the VNF to the port on the VL in the at least two VLs according to the connection requirement information;
wherein the connection requirement information comprises a correspondence between the CP on the VNF and information of the port on the VL.

4. The method according to claim 3, wherein the information of the port on the VL is a type of the port on the VL.

5. A network service deployment method, comprising:
sending, by a service request device to a service provision device, a registration request for registering a network service descriptor (NSD) of a network service (NS), wherein the NSD comprises node information of a virtualized network function (VNF) and node information of at least two virtual links (VLs) that connect different VNFs, a quantity of connection points (CPs) on the VNF is greater than or equal to 2, the node information of the VNF comprises identifier of a virtualized network function descriptor (VNFD) and connection requirement information that indicates that a CP on the VNF is to be connected to a port on a VL in the at least two VLs during instantiating the NS; and
receiving, by the service request device, a registration success response message returned by the service provision device;
wherein the connection requirement information comprises a correspondence between the CP on the VNF and information of the port on the VL.

6. The method according to claim 5, wherein the information of the port on the VL is a type of the port on the VL.

7. A network service deployment system comprising:
a network functions virtualization orchestrator (NFVO),
a virtualized network function manager (VNFM), and
a virtualized infrastructure manager (VIM), wherein
the NFVO comprises:
 a first transceiver,
 a first non-transitory memory storage comprising instructions; and
 one or more first processors in communication with the first non-transitory memory storage and the first transceiver, wherein the one or more first processors execute the instructions to obtain a network service descriptor (NSD) of a network service (NS), wherein the NSD comprises node information of a virtualized network function (VNF) and node information of at least two virtual links (VLs) that connect different VNFs, a quantity of connection points (CPs) on the VNF is greater than or equal to 2, the node information of the VNF comprises identifier of a virtualized network function descriptor (VNFD) and connection requirement information that indicates that a CP on the VNF is to be connected to a port on a VL in the at least two VLs during instantiating the NS;
the VNFM comprises:
 a second transceiver,
 a second non-transitory memory storage comprising instructions; and
 one or more second processors in communication with the second non-transitory memory storage and the second transceiver, wherein the one or more second processors execute the instructions to receive the node information of the VNF and instantiate the VNF according to the node information of the VNF; and
the VIM comprises:
 a third transceiver,
 a third non-transitory memory storage comprising instructions; and
 one or more third processors in communication with the third non-transitory memory storage and the third transceiver, wherein the one or more third processors execute the instructions to receive the node information of the at least two VLs and the connection requirement information, instantiate the at least two VLs according to the node information of the at least two VLs, connect the CP on the VNF to the port on the VL in the at least two VLs according to the connection requirement information;
wherein the connection requirement information comprises a correspondence between the CP on the VNF and information of the port on the VL.

8. The network service deployment system according to claim 7, wherein the information of the port on the VL is a type of the port on the VL.

9. A network service deployment apparatus comprising:
a transceiver;
a non-transitory memory storage comprising instructions;
one or more processors in communication with the non-transitory memory storage and the transceiver, wherein the one or more processors execute the instructions to:
receive node information of at least two virtual links (VLs) that connect different VNFs and connection requirement information that indicates that a connection point (CP) on a virtualized network function (VNF) is to be connected to a port on a VL in the at least two VLs during instantiating a network service, wherein a quantity of CPs on the VNF is greater than or equal to 2;
instantiate the at least two VLs according to the node information of the at least two VLs; and
connect the CP on the VNF to the port on the VL in the at least two VLs according to the connection requirement information;
wherein the connection requirement information comprises a correspondence between the CP on the VNF and information of the port on the VL.

10. A network service deployment apparatus, comprising:
a transceiver;
a non-transitory memory storage comprising instructions;
one or more processors in communication with the non-transitory memory storage and the transceiver, wherein the one or more processors execute the instructions to:
send, via the transceiver, to a service provision device, a registration request for registering a network service descriptor (NSD) of a network service (NS), wherein the NSD comprises node information of a virtualized network function (VNF) and node information of at least two virtual links (VLs) that connect different VNFs, a quantity of connection points (CPs) on the VNF is greater than or equal to 2, the node information of the VNF comprises identifier of a virtualized network function descriptor (VNFD) and connection requirement information that indicates that a CP on the VNF is to be connected to a port on a VL in the at least two VLs during instantiating the NS; and receive, via the transceiver, a registration success response message returned by the service provision device;

wherein the connection requirement information comprises a correspondence between the CP on the VNF and information of the port on the VL.

11. The apparatus according to claim 10, wherein the information of the port on the VL is a type of the port on the VL.

* * * * *